United States Patent
Finzel et al.

[11] Patent Number: 6,116,793
[45] Date of Patent: Sep. 12, 2000

[54] SPLICE PROTECTION DEVICE, A RECEPTACLE DEVICE FOR LIGHT WAVEGUIDES AND AN ARRANGEMENT FOR PLACING THE LIGHT WAVEGUIDES INTO THE SPLICE PROTECTION DEVICE

[75] Inventors: Lothar Finzel, Unterschleissheim; Guenter Schroeder, Esting; Frank Zimmer, Scheuring, all of Germany

[73] Assignee: Siemens Aktiengesellschaft, Munich, Germany

[21] Appl. No.: 09/058,101

[22] Filed: Apr. 9, 1998

[30] Foreign Application Priority Data

Apr. 9, 1997 [DE] Germany ............... 197 14 718

[51] Int. Cl.⁷ .................................. G02B 6/255
[52] U.S. Cl. ............................. 385/99; 385/137
[58] Field of Search ................... 385/95–99, 134, 385/135, 137; 65/501

[56] References Cited

U.S. PATENT DOCUMENTS

| | | | |
|---|---|---|---|
| 4,254,865 | 3/1981 | Pacey et al. ................... | 385/99 |
| 4,274,708 | 6/1981 | Cocito et al. . | |
| 4,489,830 | 12/1984 | Charlebois et al. ............. | 385/135 |
| 4,548,630 | 10/1985 | Biedka ........................ | 65/501 |
| 4,702,551 | 10/1987 | Coulombe .................... | 365/135 |
| 4,736,632 | 4/1988 | Case ......................... | 385/134 X |
| 4,865,412 | 9/1989 | Patterson .................... | 385/71 |
| 4,998,796 | 3/1991 | Bonanni et al. . | |
| 5,339,377 | 8/1994 | Takahashi .................... | 385/98 |
| 5,416,873 | 5/1995 | Heubscher et al. ............. | 385/99 |

FOREIGN PATENT DOCUMENTS

| | | |
|---|---|---|
| 0 065 096 | 11/1982 | European Pat. Off. . |
| 0 164 784 | 12/1985 | European Pat. Off. . |
| 0 257 841 | 3/1988 | European Pat. Off. . |
| 0 278 423 | 8/1988 | European Pat. Off. . |
| 0 768 550 | 4/1997 | European Pat. Off. . |
| 0 802 434 | 10/1997 | European Pat. Off. . |
| 37 35 886 | 5/1989 | Germany . |
| 90 00 755 U | 4/1990 | Germany . |
| 40 01 964 | 2/1991 | Germany . |
| 41 12 438 | 8/1992 | Germany . |
| 41 22 603 | 1/1993 | Germany . |
| 43 43 944 | 6/1995 | Germany . |
| 2 060 196 | 4/1981 | United Kingdom . |
| 1 600 028 | 10/1981 | United Kingdom . |
| 2 315 883 | 2/1998 | United Kingdom . |
| WO 86/00421 | 1/1986 | WIPO . |
| WO 96/05527 | 2/1996 | WIPO . |

OTHER PUBLICATIONS

Abstract of Published Japanese Application 56–030109 published Mar. 26, 1981, *Patent Abstracts of Japan*, vol. 5, No. 84, p. 64.

Abstract of Published Japanese Application 58–025611 published Feb. 15, 1983, *Patent Abstracts of Japan*, vol. 7, No. 101, p. 194.

*Primary Examiner*—John D. Lee
*Assistant Examiner*—Michael J. Stahl
*Attorney, Agent, or Firm*—Hill & Simpson

[57] ABSTRACT

A splice protection device is constructed for acceptance of a pair of light waveguides, with the splice location being optimally sealed by elastic holders having an adhesive film. The elastic splice protection device can be utilized in a bent shape, so that the dimensions of a cassette and other receptacle devices can be designed to be smaller.

13 Claims, 4 Drawing Sheets

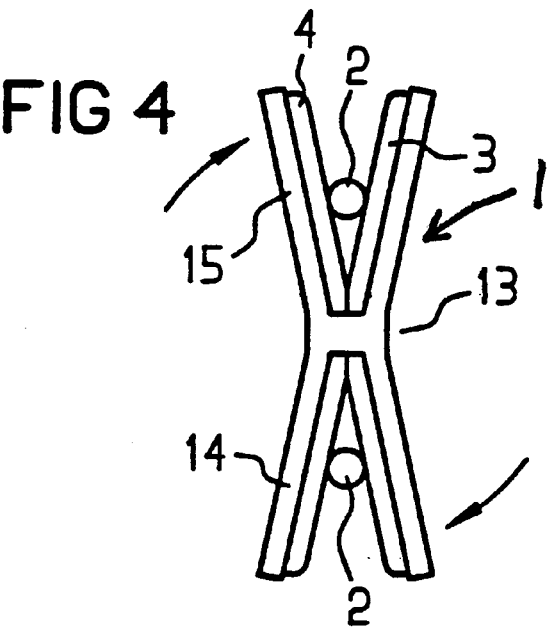
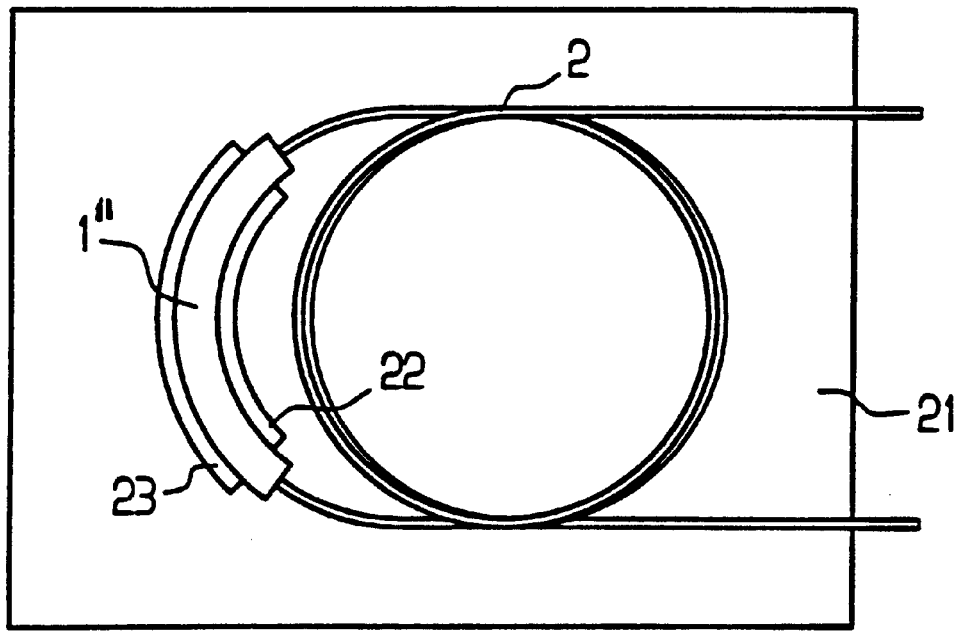

SPLICE PROTECTION DEVICE, A RECEPTACLE DEVICE FOR LIGHT WAVEGUIDES AND AN ARRANGEMENT FOR PLACING THE LIGHT WAVEGUIDES INTO THE SPLICE PROTECTION DEVICE

BACKGROUND OF THE INVENTION

Individual light waveguides and ribbon fibers are provided with a splice protection device in the area of their splice locations in order to avoid damage due to mechanical stressing.

German Patent 41 12 438 discloses a sheet metal splice device for joining two fibers end-to-end. The device comprises guide channels for both the fibers, which are stripped of their coatings or claddings in the region of the splice and channels for the light waveguide, which are formed by the fiber surrounded by the coating or jacket. The light waveguides are fixed on this metal splice device by pressing.

German Offenlegungsschrift 41 22 603 discloses a planar holder for light waveguide fibers that is suitable for the acceptance of light waveguides extending parallel, such as what is referred to as a waveguide ribbon. Individual light waveguides can likewise be combined. Problems in handling individual light waveguides are not discussed in this reference.

During the course of miniaturization, cassettes for the acceptance of splices and reserve lengths of the light waveguides will also exhibit smaller and smaller dimensions. The splice protection device should also be utilized here.

SUMMARY OF THE INVENTION

An object of the present invention is to provide a splice protection device or splice protector that is suitable for modern light waveguide networks. As a further object, the invention is directed to providing a receptacle device for receiving the splice protection or splice protecting device. An additional object of the invention is an arrangement for placing the fibers into the splice protector or splice protection device.

The first object is achieved by a splice protector or splice protection device comprising two plate-shaped holders, which are provided with an adhesive on their sides lying opposite one another and between which spliced light waveguides are arranged. The splice protection is fashioned for the acceptance of the pair of light waveguides.

The fashioning or, respectively, employment of the splice protector for respectively two fibers is advantageous. This splice protection is especially suited for light waveguide networks, wherein transmission and reception data are transmitted via fibers separated from one another. Both ring networks as well as point-to-point connections are being increasingly realized as two-fiber networks. The fiber pairs are respectively placed in common in a splice protection device, so that an automatic allocation also occurs.

When the splice protection device is also implemented flexible or already in a pre-bent version, then the spliced fibers can also be bent, such that the dimensions of the cassettes and other receptacle devices can be fashioned to be smaller. An additional object is achieved in that the receptacle device can accept an arcuate splice protection device.

Other objects are achieved by an arrangement for placing the spliced light waveguides in a splice protection device, wherein a transport means is arranged in the splicing device for clamping the light waveguides and enabling the transport of respective light waveguides after splicing from the splicing position to the splice protection device for depositing therein.

The particular advantage of this arrangement is that damage to or even the breakage of the light waveguides is avoided when transporting from the splicing device into the splice protection device.

Other advantages and features of the invention will be readily apparent from the following description of the preferred embodiments, the drawings and claims.

BRIEF DESCRIPTION OF THE DRAWINGS

FIG. 4 is an end view of a second embodiment of the splice protection device according to the present invention;

FIG. 5 is a plan view of a splice protection device used in a cassette;

DESCRIPTION OF THE PREFERRED EMBODIMENTS

Figure 1:
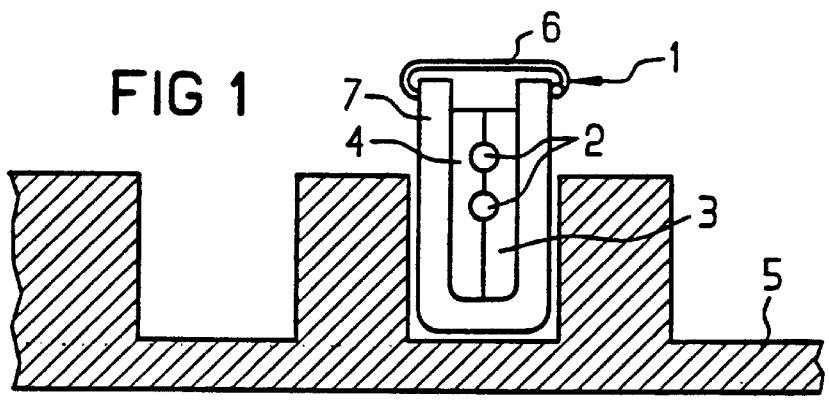
FIG. 1 is a cross-sectional view with portions in elevation for purposes of illustration of a splice protection device in accordance with the present invention.

The principles of the present invention are particularly useful when incorporated in a splice protector or splice protection device, generally indicated at 1 in FIG. 1. The protector or device 1 is inserted into a splice comb 5. The splice protection device 1 is for a pair of light waveguides 2. These waveguides are inserted between planar holders 3 and 4, which are composed of an elastic or even a plastically-deformable material. The planar holders 3 and 4 are surrounded by a housing 7 that is provided with a closure 6 and form means for holding or clamping the holders 3 and 4 on the waveguide 2. When the housing is fabricated of metal, bending the legs together can suffice for holding the plates 3 and 4 in the closed position. The legs can also be connected to one another by clips or other fastening elements.

Each of the light waveguides 2 has a fiber core 8 (see FIG. 3), which is surrounded by a coating or cladding jacket 9.

Figure 2:
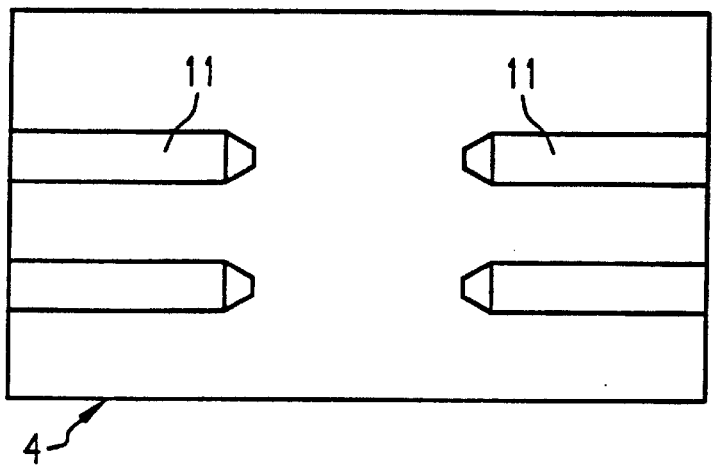
FIG. 2 is an enlarged side view of a planar holder member used in the splice protection device of FIG. 1.

As illustrated in FIG. 2, each of the holders, such as the planar holder 4 on a surface which engages the waveguides, is provided with channels 11 for receiving the jacket portion 9 of each of the waveguides 2 as the core 8 is engaged on the surface of the plate 4. The plate or holder 4 could have a channel or groove of a smaller cross-section extending between the ends of the channels 11 for receiving the bare fiber and the splice.

Figure 3:
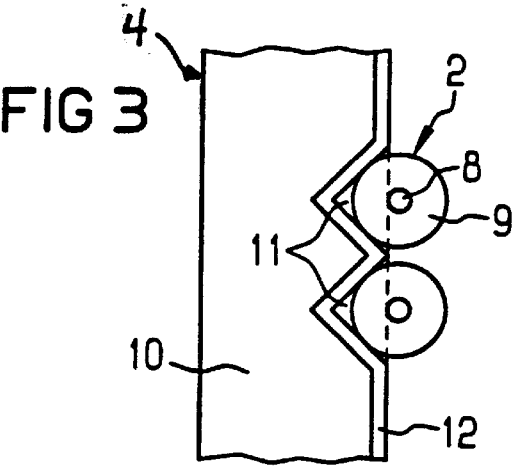
FIG. 3 is an end view of a planar holder member which can be used in the splice protection device of FIG. 1.

As illustrated in FIG. 3, the planar holder 4 is formed by an elastic plate member 10, which has channels 11 provided with an adhesive film 12 that will practically seal or hold both the coating or jackets 9 as well as the fibers 8 of each of the light waveguides when the planar holders are joined together. This effect can be further improved when the channels are not triangularly fashioned, as illustrated, but exhibit a semi-circular cross-section matched to the cross-section of the light waveguides or is adapted to the cross-section of the light waveguides.

An embodiment of the splice protection device is generally indicated at 1' in FIG. 4. The splice protection device 1' has a pair of housing portions 14 and 15, which have a common base 13. Each of the housing portions 14 and 15 has a pair of plates or legs, which are V-shaped, so that the entire housing arrangement has a shape of an X. As illustrated, each of the portions 14 and 15 receive planar holders 3 and 4 and the light waveguide 2 can be placed between each of the planar holders 3 and 4 of the portions 14 or 15. The waveguides are then fixed in position by pressing the legs of the portions 14 and 15 together. The individual handling of the light waveguides is further simplified by this mounting arrangement.

The inside surfaces of the housing 7 can also serve directly as planar holders by being coated with an elastic adhesive film or with a hot-melt adhesive. A softening of the adhesive film or of a hot-melt adhesive is advantageous, since the light waveguides and, in particular, the splice location is sealed as a result of this melting of the adhesive or hot-melt material.

In FIG. 5, a bent splice protection device 1" is arranged in a cassette 21 and is held by webs 22 and 23. The dimensions of the cassette 21 are determined by the bendability of the splice protection device and also essentially by the minimum allowable bending radius for the waveguide 2. When the housing 7 is required, it can likewise be flexibly implemented.

An alternative thereto is the employment of a bent, rigid housing, which determines the bending radius. Bent planar holders can also be introduced into this bent housing. The bendable version, however, is easier to handle and can be universally employed.

A bent splice protection device can, of course, also be employed for individual fibers. Fundamentally, it can also be employed given ribbon fibers or, respectively, for the acceptance of more than two fibers.

Figure 6:
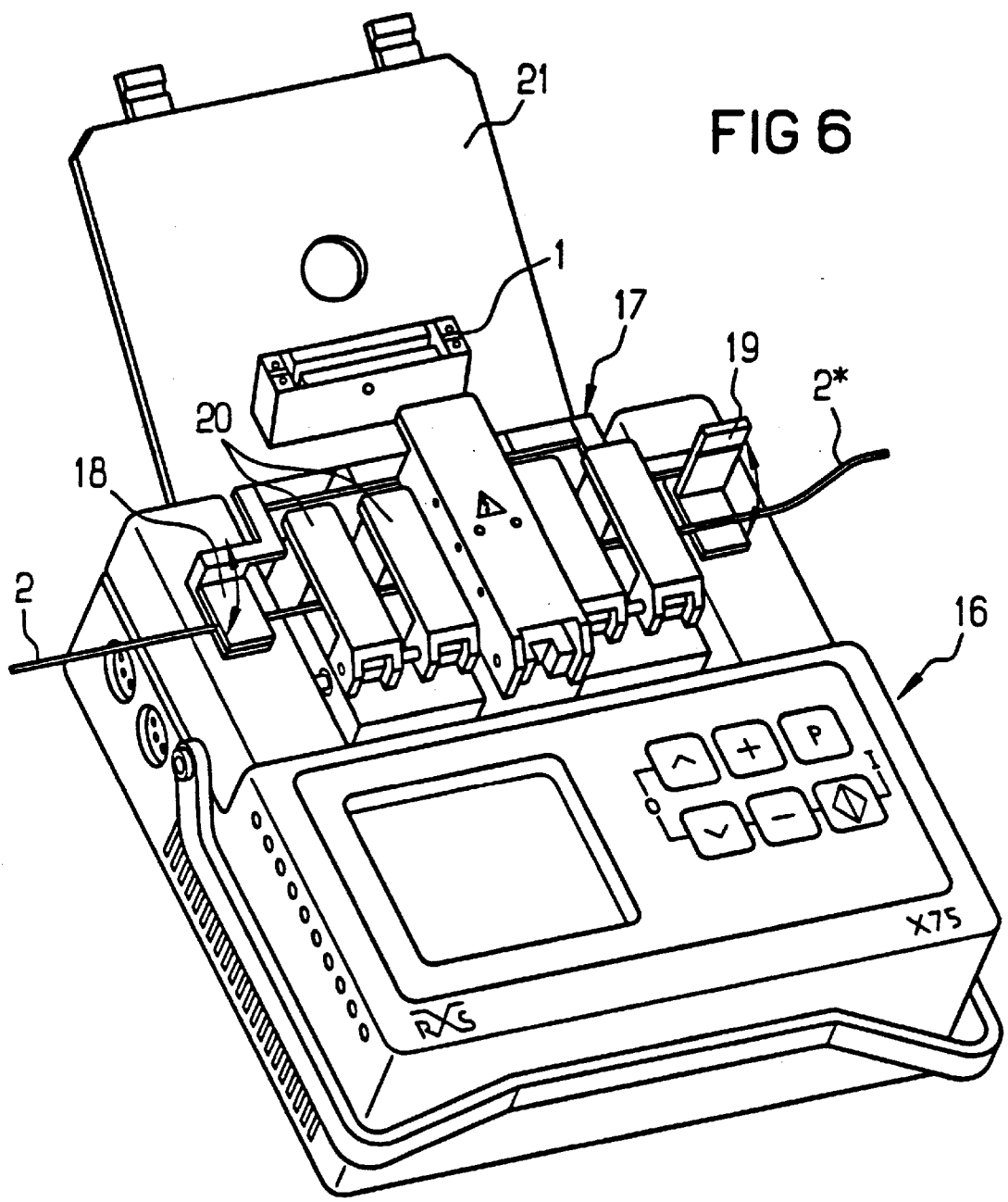
FIG. 6 is a perspective view of a splicing device with an arrangement for transferring a spliced light waveguide.
Figure 7:
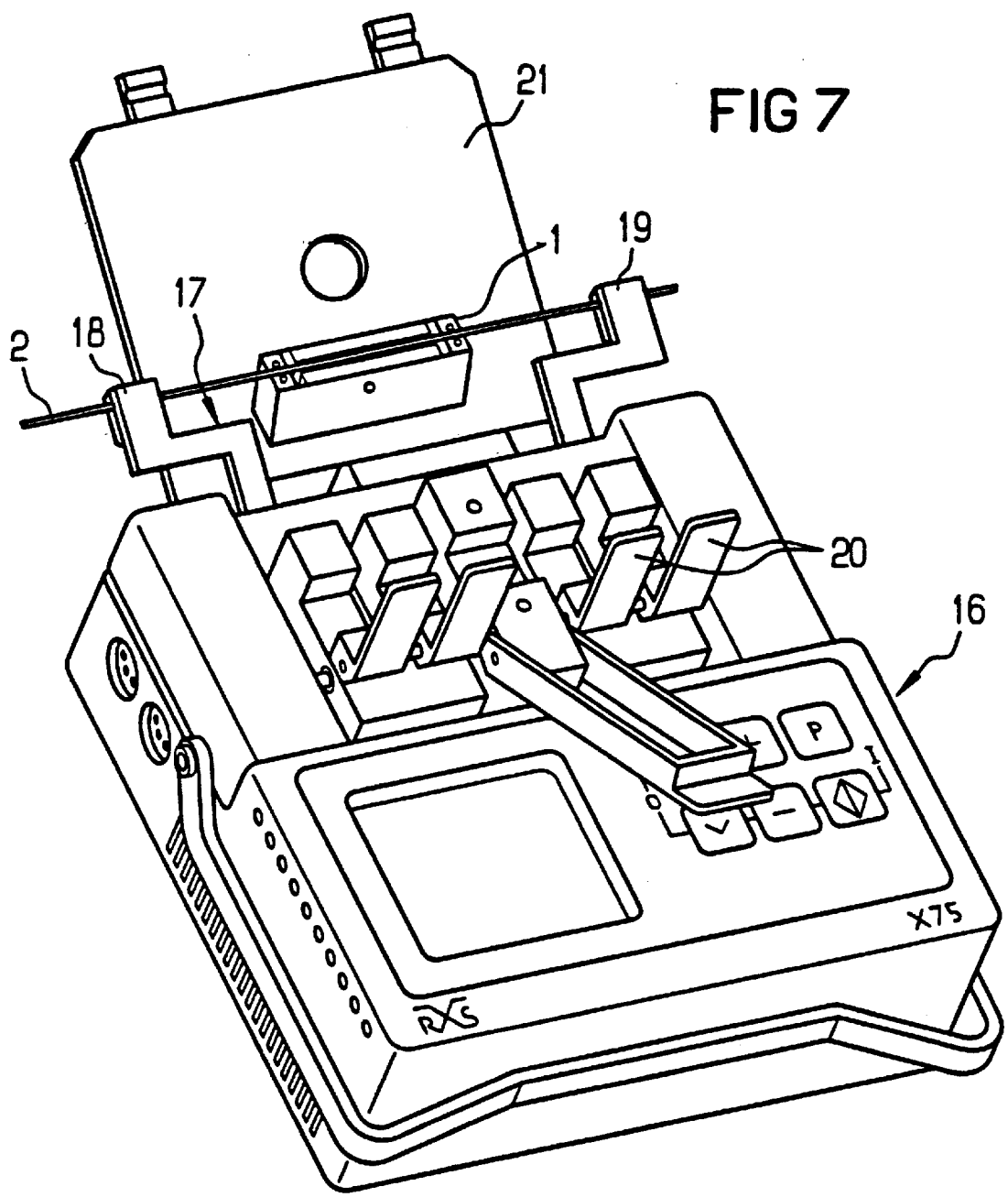
FIG. 7 is a perspective view of the device of FIG. 6 with the spliced waveguide being transported into the splice protection device.

A splicing device is generally indicated at 16 in FIGS. 6 and 7. The splicing device receives two fibers of the waveguides 2 and 2*, which fibers are inserted for welding, and the welding occurs thermally with the assistance of an arc. The fibers are fixed in clamps 18 and 19 of a transport device or means 17 and are held in position during the welding by fiber holders 20 of the splicing device 16. After the splice has been completed, the fiber holders 20 of the splicing device are opened, as illustrated in FIG. 7. Then, the spliced together fibers are removed from the splicing device and are deposited in a splice protection device 1, as shown in FIG. 7, by the transport means 17 being pivoted from the splicing position to the transfer position.

After the splicing of the first pair of fibers, the procedure is repeated with the second pair of fibers, which are correspondingly deposited in the splice protection device 1. To this end, either the position of the splice protection device or that of the transport means can be modified, so that the light waveguides are placed in the desired position in the splice protection device. Over and above this, it is possible to provide different swivel regions or ranges by changing the length of the lever arms and/or the pivot point of the means 17. Instead of the swivelling, a lifting of the fibers and a displacement up to a predetermined elevated point with following lowering is also possible.

Although various minor modifications may be suggested by those versed in the art, it should be understood that we wish to embody within the scope of the patent granted hereon all such modifications as reasonably and properly come within the scope of our contribution to the art.

We claim:

1. A splice protection device for light waveguides comprising a housing having a central section with two pairs of legs opening outward therefrom, each pair of legs having a V shape and receiving a pair of plate-like planar holders provided with an adhesive on sides facing each other, said holders receiving at least a pair of spliced light waveguides therebetween, each pair of legs being bendable together to press the pair of holders onto inserted light waveguides and to form means for holding the planar holders together.

2. A splice protection device according to claim 1, wherein at least one holder is provided with two parallel guide channels for the waveguides.

3. A splice protection device according to claim 1, wherein one of the two planar holders lying opposite one another initially has guide channels.

4. A splice protection device according to claim 1, wherein at least one of the holders, on a surface facing the other holder, is provided with guide channels for receiving a coated portion of the light waveguide, said channels being separated by a surface of the planar holder for receiving the fiber of the waveguide, which fiber has had the coating stripped therefrom.

5. A splice protection device according to claim 1, wherein at least one of the holders has a set of first guide channels provided for accepting the coated portion of the light waveguides, said first guide channels being separated by a channel of smaller dimensions for receiving a fiber of the light waveguides in a spliced region.

6. A splice protection device according to claim 1, wherein at least one of the holders is provided with channels, and the adhesive is applied on the inside surface of the planar holders including a surface of each channel.

7. A splice protection device according to claim 6, wherein the adhesive is an elastic film applied on the inside surface of the planar holders and the surfaces of the channel.

8. A splice protection device according to claim 6, wherein the adhesive is a hot-melt adhesive applied on the inside surface of the planar holders and the surfaces of the channel.

9. A splice protection device according to claim 1, wherein the adhesive is a hot-melt adhesive and the light waveguides are sealed by heating the hot-melt adhesive.

10. A splice protection device according to claim 1, wherein each of the holders is fabricated of a material selected from elastic materials and plastic materials.

11. A splice protection device according to claim 1, wherein the splice protection device is provided with a bent form.

12. A splice protection device according to claim 1, wherein the plate-like holders are flexible.

13. A splice protection device according to claim 1, wherein the plate-like holders have a bent shape.

* * * * *